(12) United States Patent
Tseng

(10) Patent No.: US 8,960,917 B2
(45) Date of Patent: Feb. 24, 2015

(54) DIGITAL LIGHT PROCESSING PROJECTOR USING LASER AND LIGHT EMITTING DIODE

(75) Inventor: Kuo-Fong Tseng, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 148 days.

(21) Appl. No.: 13/561,100

(22) Filed: Jul. 30, 2012

(65) Prior Publication Data

US 2013/0314671 A1    Nov. 28, 2013

(30) Foreign Application Priority Data

May 22, 2012   (TW) .............................. 101118244 A

(51) Int. Cl.
*G03B 21/00*    (2006.01)

(52) U.S. Cl.
USPC .................. 353/31; 353/30; 353/84; 353/94; 353/85; 353/99; 349/5; 349/7

(58) Field of Classification Search
CPC ......... H04N 9/31; H04N 9/74; H04N 9/3197; H04N 9/3155; H04N 9/3164; H04N 9/3129; G03B 21/14; G03B 21/204
USPC ............ 353/30, 31, 84, 94, 85, 98, 99; 349/5; 349/7–9, 13; 362/84, 135, 231, 235, 293; 348/743–747
See application file for complete search history.

(56) References Cited

U.S. PATENT DOCUMENTS

| | | | |
|---|---|---|---|
| 8,444,276 B2* | 5/2013 | Shibasaki ........................ | 353/85 |
| 8,585,213 B2* | 11/2013 | Plut ................................. | 353/85 |
| 2008/0079904 A1* | 4/2008 | Bartlett ........................... | 353/31 |
| 2011/0043765 A1* | 2/2011 | Shibasaki ........................ | 353/31 |
| 2012/0242912 A1* | 9/2012 | Kitano ............................. | 348/759 |
| 2013/0070205 A1* | 3/2013 | Pan et al. ........................ | 353/31 |
| 2013/0100417 A1* | 4/2013 | Yang et al. ...................... | 353/31 |
| 2013/0194552 A1* | 8/2013 | Matsubara et al. ............. | 353/31 |
| 2014/0211170 A1* | 7/2014 | Kitano et al. ................... | 353/31 |
| 2014/0253882 A1* | 9/2014 | King et al. ...................... | 353/31 |

\* cited by examiner

*Primary Examiner* — Sultan Chowdhury
(74) *Attorney, Agent, or Firm* — Novak Druce Connolly Bove + Quigg LLP

(57) ABSTRACT

A digital light processing projector includes a light emitting diode (LED), a laser, a rotatable optical element, a reflector, a first filter, a second filter, a digital micro-mirror device (DMD), and a projection lens. The LED and the laser respectively emit a first and second homogeneous lights. The rotatable optical element converts a first portion of the second homogeneous light to a third homogeneous light, reflects the third homogeneous light, and transmits a second portion of the second homogeneous light. The reflector reflects the third homogeneous light. The first filter transmits the first homogeneous light, and reflects the second portion to the second filter. The second filter transmits the second portion and the first homogeneous light, and reflects the third homogeneous light to the DMD. The DMD modulates the first, second and third homogeneous lights to obtain optical images. The projection lens projects the optical images on a screen.

9 Claims, 1 Drawing Sheet

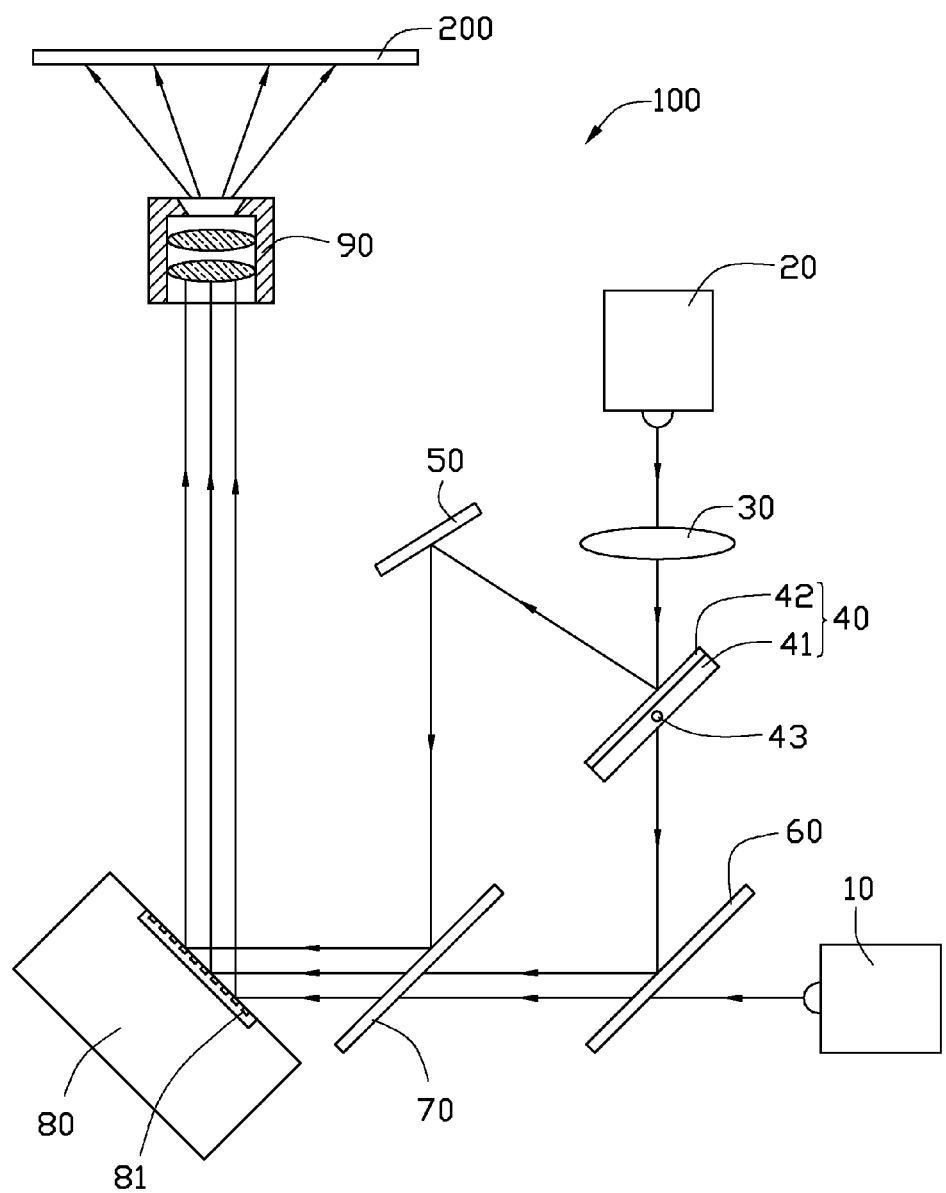

DIGITAL LIGHT PROCESSING PROJECTOR USING LASER AND LIGHT EMITTING DIODE

BACKGROUND

1. Technical Field

The present disclosure relates to a digital light processing (DLP) projector using a laser and a light emitting diode (LED).

2. Description of Related Art

DLP projectors can use three lasers as light sources. Because lasers have high collimation, and the light rays from each of the lasers have small emitting angle, therefore, it will generate some light-dots on projection images when the light rays reach a screen. The quality of the projection images will be influenced.

Therefore, it is desirable to provide a DLP projector that can overcome the above-mentioned limitations.

BRIEF DESCRIPTION OF THE DRAWING

Many aspects of the embodiments should be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

The figure is a schematic view of a DLP projector, according to an exemplary embodiment.

DETAILED DESCRIPTION

The figure illustrates a digital light processing (DLP) projector 100 in accordance with an embodiment. The DLP projector 100 includes a first light source 10, a second light source 20, a converging lens 30, a rotatable optical element 40, a reflector 50, a first filter 60, a second filter 70, a digital micro-mirror device (DMD) 80, and a projection lens 90.

The first light source 10 is used for emitting a first homogeneous light, and the second light source 20 is used for emitting a second homogeneous light having a different wavelength from that of the first homogeneous light. The emitting direction of the first homogeneous light is substantially perpendicular to the emitting direction of the second homogeneous light. In this embodiment, the first homogeneous light is red light, and the second homogeneous light is blue light. The first light source 10 is a red light emitting diode (LED), and the second light source 20 is a blue laser.

The converging lens 30 is positioned in a light path of the second light source 20 and is used for converging the second homogeneous light.

The rotatable optical element 40 is positioned on a light path of the second homogeneous light from the converging lens 30, and includes a substrate 41 and a phosphor layer 42 coated on the substrate 41. The phosphor layer 42 faces the converging lens 30 and is used for converting a first portion (spectrum) of the second homogeneous light to a third homogeneous light. Color of the third homogeneous light is different from the color of the first homogeneous light and the color of the second homogeneous light. The substrate 41 is used for reflecting the third homogeneous light, and transmitting a second portion (remaining portion) of the second homogeneous light. The rotatable optical element 40 can rotate around its shaft 43 to change the emitting direction of the third homogeneous light. In this embodiment, the third homogeneous light is green light. In this embodiment, the shaft 43 is a pole and is positioned on an outer surface of the substrate 41.

The reflector 50 is positioned in a light path of the third homogeneous light from the rotatable optical element 40 and is used for reflecting the third homogeneous light.

The first filter 60 is positioned on light paths of the first homogeneous light and the second portion of the second homogeneous light. The first filter 60 is used for transmitting the first homogeneous light to the second filter 70 and reflecting the second portion to the second filter 70.

The second filter 70 is positioned on light paths of the first and third homogeneous lights and the second portion of the second homogeneous light. The second filter 70 is used for transmitting the first homogeneous light and the second portion to the DMD 80 and reflecting the third homogeneous light to the DMD 80.

The DMD 80 is configured for modulating the first homogeneous light, the second portion of the second homogeneous light, and the third homogeneous light incident thereon into optical images based upon a video signal input thereto. The DMD 80 includes a number of micro-mirrors 81 in an array. The micro-mirrors 81 can rotate independently. When the micro-mirrors 81 are in a first state, the micro-mirrors 81 can reflect the first homogeneous light, the second portion of the second homogeneous light, and the third homogeneous light into the projection lens 90. When the micro-mirrors 81 are in a second state, the micro-mirrors 81 can reflect the first homogeneous light, the second portion of the second homogeneous light, and the third homogeneous light away from the projection lens 90. The rotating speed of each micro-mirror 81 is less than the rotating speed of the rotatable optical element 40, and thus the third homogeneous light from the rotatable optical element 40 can be reflected by the micro-mirrors 81 in the first state.

The projection lens 90 is used for receiving the first homogeneous light, the second portion of the second homogeneous light, and the third homogeneous light and projecting the optical images on a screen 200.

In use, the first homogeneous light from the first light source 10 passes through the first filter 60 and the second filter 70 to reach the DMD 80. The second homogeneous light from the second light source 20 is converged by the converging lens 30 and then reaches the rotatable optical element 40. The first portion of the second homogeneous light is converted to the third homogeneous light by the phosphor layer 42. The third homogeneous light is reflected by the substrate 41 to the reflector 50 and is reflected by the reflector 50 to the second filter 70, then is reflected by the second filter 70 to the DMD 80. The second portion of the second homogeneous light passes through the substrate 41 and is reflected by the first filter 60 to the second filter 70, then passes through the second filter 70 to reach the DMD 80. The DMD 80 modulates the first homogeneous light, the second portion of the second homogeneous light, and the third homogeneous light incident thereon into optical images. The projection lens 90 projects the optical images on the screen 200.

By employing the DLP projector 100, the rotatable optical element 40 can increase the emitting angle of the third homogeneous light, and thus the light-spots of the optical images can be reduced or at least alleviated, and the quality of the optical images can be improved.

In other embodiments, the second light source 20 can be a blue LED.

In other embodiments, the first homogeneous light can be blue light, the second homogeneous light can be red light, and the third homogeneous light can be green light.

In other embodiments, the converging lens 30 can be omitted.

It will be understood that the above particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A digital projector, comprising:
   a first light source, the first light source being a light emitting diode (LED) and configured for emitting a first homogeneous light;
   a second light source, the second light source being a laser and configured for emitting a second homogeneous light;
   a rotatable optical element capable of rotate around its shaft and configured for converting a first portion of the second homogeneous light into a third homogeneous light of a color different from a color of the first homogeneous light, then reflecting the third homogeneous light, and transmitting a second portion of the second homogeneous light;
   a first filter configured for transmitting the first homogeneous light from the first light source and reflecting the second portion of the second homogeneous light from the rotatable optical element;
   a reflector configured for reflecting the third homogeneous light from the rotatable optical element;
   a second filter configured for transmitting the second portion of the second homogeneous light and the first homogeneous light from the first filter and reflecting the third homogeneous light from the reflector;
   a digital micro-mirror device (DMD) configured for modulating the second portion of the second homogeneous light, the first homogeneous light, and the third homogeneous light to obtain optical images; and
   a projection lens configured for projecting the optical images from the DMD on a screen.

2. The digital projector of claim 1, wherein the rotatable optical element comprises a substrate and a phosphor layer coated on the substrate, the phosphor layer faces the second light source and is configured for converting the first portion of the second homogeneous light into the third homogeneous light, the substrate can rotate round the shaft, the shaft is positioned on an outer surface of the substrate, the substrate is configured for transmitting the second portion of the second homogeneous light, and the substrate is further configure for rotatably reflecting the third homogeneous light to the reflector.

3. The digital projector of claim 1, wherein the DMD comprises a plurality of micro-mirrors arranged in an array, the micro-mirrors rotate independently, a rotating speed of each of the micro-mirrors is less than a rotating speed of the rotatable optical element.

4. The digital projector of claim 1, further comprising a converging lens positioned between the second light source and the rotatable optical element, wherein the converging lens is configured for converging the second homogeneous light to the rotatable optical element.

5. The digital projector of claim 1, wherein an emitting direction of the first homogeneous light is substantially perpendicular to an emitting direction of the second homogeneous light.

6. The digital projector of claim 1, wherein the first light source is a light emitting diode, and the second light source is a laser.

7. The digital projector of claim 1, wherein color of the third homogeneous light is different from that of the first homogeneous light and that of the second homogeneous light.

8. The digital projector of claim 7, wherein the first homogeneous light is a red light, the second homogeneous light is a blue light, and the third homogeneous light is a green light.

9. The digital projector of claim 7, wherein the first homogeneous light is a blue light, the second homogeneous light is a red light, and the third homogeneous light is a green light.

* * * * *